UNITED STATES PATENT OFFICE.

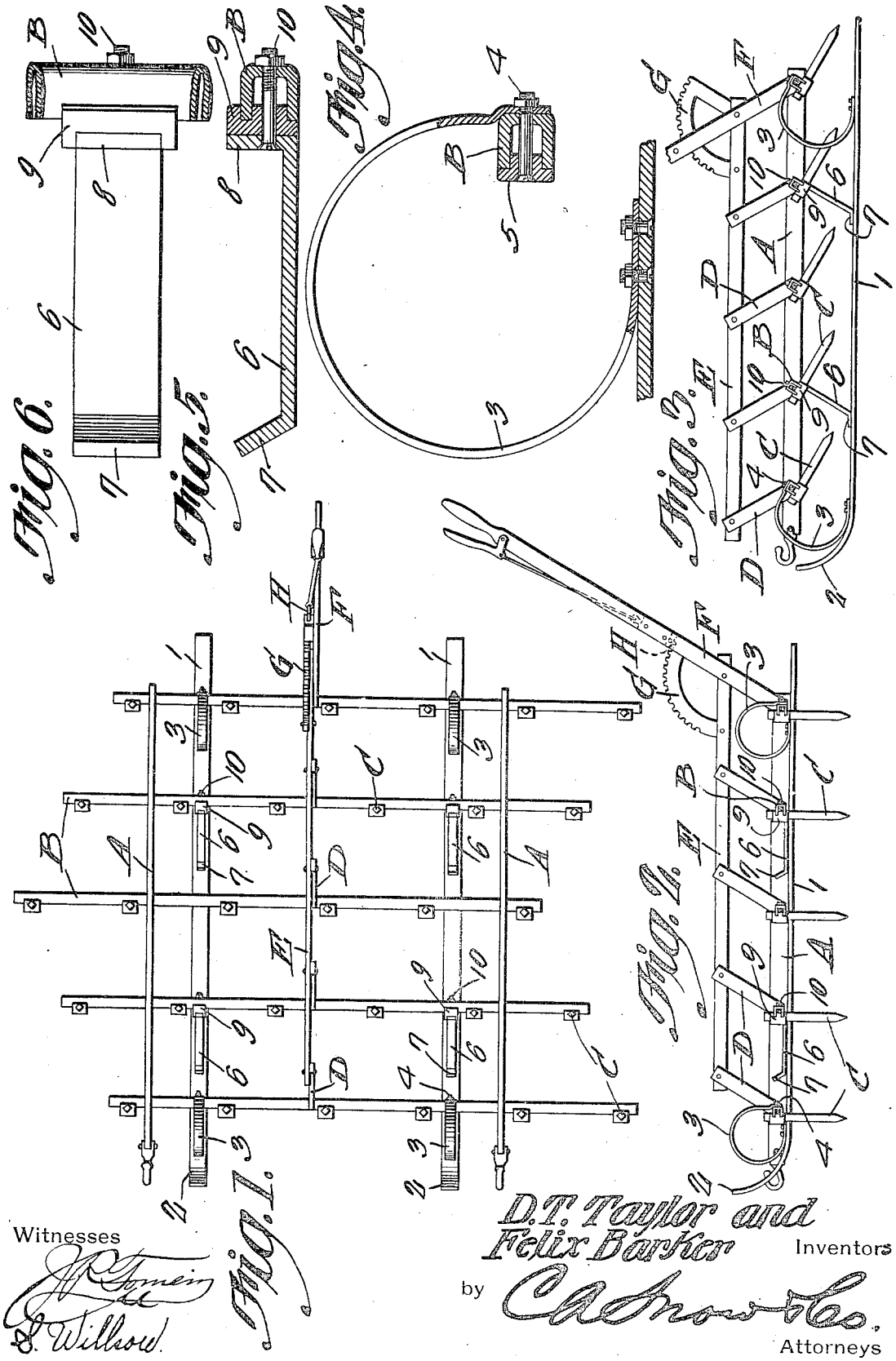

DAVID T. TAYLOR AND FELIX BARKER, OF DAVILLA, TEXAS.

ATTACHMENT FOR HARROWS.

1,055,498. Specification of Letters Patent. Patented Mar. 11, 1913.

Application filed November 4, 1912. Serial No. 729,522.

*To all whom it may concern:*

Be it known that we, DAVID T. TAYLOR and FELIX BARKER, citizens of the United States, residing at Davilla, in the county of Milam, State of Texas, have invented a new and useful Attachment for Harrows, of which the following is a specification.

This invention relates to an attachment for harrows whereby the collection and piling of cotton stalks and the like is facilitated.

When it is desired to clear a cotton field, it is customary to plow up the stalks and, as it is practically impossible to gather these stalks by means of an ordinary rake, for the reason that the stalks are left partly covered by loose dirt, it has become the universal custom to collect the stalks by means of a harrow. These harrows are used to drag the loosened stalks to a point where they are to be burned but, inasmuch as the teeth of the harrow project into the mass of stalks collected, it is necessary to lift the harrow bodily out of engagement with the collected stalks before the harrow can again be used to rake up stalks. This is, obviously, a slow and laborious operation and various means have been devised whereby the harrow can be more readily lifted out of the accumulated stalks. These devices, however, have been crude and inefficient.

One of the objects of the present invention is to provide an attachment which can be applied readily to various makes of harrows utilizing rotary teeth carrying bars, the said attachment operating to elevate the harrow bodily when the teeth are swung rearwardly so that, during the continued forward movement of the harrow, the teeth will be drawn from the accumulated mass and will pass to any desired distance therefrom after which said teeth can be turned back to active positions and will be lowered automatically into engagement with the soil.

Another object is to provide an attachment of this character which is simple in construction, cheap to manufacture, and which can be easily applied to a harrow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a harrow having the present improvements combined therewith. Fig. 2 is a side elevation thereof. Fig. 3 is a view similar to Fig. 2 and showing the device shifted to active position and the teeth arranged to withdraw from a collected mass of vegetation. Fig. 4 is an enlarged view partly in section and partly in side elevation, showing one of the connections between the runner of the attachment and a tooth bar. Fig. 5 is a longitudinal section through one of the depressing arms and the means provided for attaching it to a tooth bar. Fig. 6 is a plan view of said depressing arm and its attaching means.

Referring to the figures by characters of reference A designates the side strips of a harrow, there being parallel transversely extending bars B mounted to rotate within the strips and having harrow teeth C secured thereto in the usual or any preferred manner. Arms D are likewise connected to the bars B and extend upwardly therefrom along parallel lines, these arms D being pivotally connected to an actuating bar E, which, in turn, is pivotally connected to a lever F extending upwardly from one of the bars B. A toothed segment G is carried by the bar E and is adapted to be engaged by a pawl H carried by the lever so that, by shifting the lever angularly, the teeth of the harrow can be caused to swing backwardly or forwardly so as to assume either inclined or vertical positions. This construction and arrangement of parts does not constitute any part of the present invention but is embodied in various types of harrows now in use.

The present invention includes two parallel runners 1, the front ends of which are preferably upturned, as shown at 2. Secured to the front end portion of each runner is a stiff bowed spring 3, the upper end of which bears upon preferably the front bar B at a point at that side of the bar opposite to the side to which the teeth C are secured. This spring 3 may be attached to the bar B by means of a bolt 4 extending through the spring and through a block or washer 5 which bears upon the bar B, as shown in Fig. 4. A similar bowed spring connects the rear portion of the runner 1 to the adjacent bar B, the arrangement of the two springs 3 being indicated clearly in Figs. 2 and 3. The springs 3 are so shaped as to hold the runners 1 normally elevated close to the bars B, as shown in Fig. 2, this being the position of the runners when the teeth C are extended downwardly along vertical or substantially vertical lines.

Connected to certain of the bars B and directly above each of the runners 1, are depressing arms 6 each of which has a foot 7 extending from the free end thereof at an angle thereto while a head or offset portion 8 is provided at the upper end of the arm. This head is adapted to be clamped to a block or washer 9 bearing against one of the bars B and held thereto by means of a bolt 10 which extends through the head and block and also through the bar. This construction is clearly shown in Figs. 5 and 6. The arms 6 are so arranged that, when the teeth C are extending downwardly as shown in Fig. 2, the arms are extended forwardly between certain of the bars B and are in contact with the runners 1.

It will be apparent that when the attachment herein described is in position, the harrow can be used after the manner of an ordinary harrow. When it is drawn forward the teeth C will engage stalks and the like in the paths thereof and will drag them to a point where they are to be dumped. When this point is reached, the operator merely unlocks lever F from the segment G and swings the lever forward. This causes the bars B to rotate about their longitudinal axes and, at the same time, the teeth C are swung backwardly and the depressing arms 6 are swung downwardly. These depressing arms bear against the runners 1 and push them downwardly into contact with the soil, at the same time raising the harrow frame so as to lift the teeth C entirely out of contact with the soil. Thus the parts are brought ultimately to the positions indicated in Fig. 3 and, as the harrow continues to move forward, the weight thereof is supported by the runners 1 and, as the teeth C are inclined, they will withdraw readily from the accumulated material while the runners 1 glide over any material which may be in the paths thereof. It thus becomes unnecessary to lift the harrow as heretofore and the device can be actuated as easily for raking up and piling stalks and the like as it can be for harrowing. It will be understood of course, that, when the lever F is swung back so as to bring the teeth C back to their initial or upstanding positions, the arms 6 will move away from the runners 1 and the springs 3, which are under tension, when the runners are in their active positions, will elevate the runners up to their normal positions illustrated in Fig. 2.

What is claimed is:—

1. An attachment for harrows having revoluble tooth carrying bars, including runners, supporting springs for connecting the end portions of the runners to the tooth carrying bars, runner depressing means, and means for connecting the runners to tooth carrying bars of the harrow.

2. The combination with a harrow having revoluble tooth carrying bars and means for rotating the bars in unison, of runners, spring connections between the runners and certain of the bars, said connections constituting means for normally holding the runners elevated while the teeth of the harrow are in active positions, and means carried by certain of the bars for depressing the runners when the teeth are swung rearwardly.

3. The combination with a harrow having revoluble tooth carrying bars, of runners extending under the bars, spring connections between the runners and certain of the bars, said connections constituting means for holding the runners elevated when the bars and teeth are in their normal or active positions, and runner depressing means connected to one of the bars and shiftable therewith to move the runner downwardly to active position when the teeth are swung out of active positions.

4. The combination with a harrow including revoluble tooth carrying bars and means for shifting the teeth simultaneously of runners, spring arms connecting the runners to certain of the bars and constituting means for holding the runners elevated when the teeth are in their normal or active positions, and means carried by certain of the bars for depressing the runners against the action of the springs and into active positions when the teeth are swung rearwardly out of active positions.

5. The combination with a harrow including revoluble tooth carrying bars and means for rotating them simultaneously, of runners extending under the bars, spring connections between the runners and certain of the bars and constituting means for holding the runners normally elevated while the teeth are in active positions, depressing arms connected to and revoluble with certain of the bars for lowering the runners when the teeth are swung rearwardly out of active positions.

6. An attachment for harrows having revoluble tooth carrying bars, including runners, yielding means for connecting the runners to the tooth carrying bars, runner depressing means, and means for connecting the runners to the tooth carrying bars of the harrow.

7. The combination with a harrow having revoluble tooth carrying bars and means for rotating the bars in unison, of soil engaging supporting means, yielding connections between said means and certain of the bars, said connections constituting means for normally holding the supporting means elevated while the teeth of the harrow are in active positions, and means carried by certain of the bars for depressing the soil engaging means when the teeth are swung upwardly.

In testimony that we claim the foregoing as our own, we have hereto affixed our signatures in the presence of two witnesses.

DAVID T. TAYLOR.
FELIX BARKER.

Witnesses:
E. C. WILSON,
A. E. CONN.